US009386632B2

(12) United States Patent
Ji (10) Patent No.: US 9,386,632 B2
(45) Date of Patent: Jul. 5, 2016

(54) APPARATUS FOR SUBSTRATE TREATMENT AND METHOD FOR OPERATING THE SAME

(71) Applicant: AP SYSTEMS INC., Hwaseong-Si, Gyeonggi-Do (KR)

(72) Inventor: Sang-Hyun Ji, Yongin-Si (KR)

(73) Assignee: AP SYSTEMS INC. (KR)

( * ) Notice: Subject to any disclaimer, the term of this patent is extended or adjusted under 35 U.S.C. 154(b) by 0 days.

(21) Appl. No.: 14/403,575

(22) PCT Filed: May 21, 2013

(86) PCT No.: PCT/KR2013/004427
§ 371 (c)(1),
(2) Date: Nov. 24, 2014

(87) PCT Pub. No.: WO2013/176453
PCT Pub. Date: Nov. 28, 2013

(65) Prior Publication Data
US 2015/0181649 A1    Jun. 25, 2015

(30) Foreign Application Priority Data

May 24, 2012  (KR) .................. 10-2012-0055490
Mar. 21, 2013  (KR) .................. 10-2013-0030260

(51) Int. Cl.
*H05B 1/02*    (2006.01)
*H05B 3/00*    (2006.01)
*G01J 5/00*    (2006.01)

(52) U.S. Cl.
CPC ............. *H05B 1/0233* (2013.01); *G01J 5/0007* (2013.01); *G01J 5/0044* (2013.01); *H05B 3/0047* (2013.01)

(58) Field of Classification Search
CPC ...... H05B 1/0233; H05B 3/0047; H05B 1/02; G01J 5/0044; G01J 5/0007
USPC ............. 219/121.45, 502, 497; 392/416–420; 118/725; 156/345.28–345.28
See application file for complete search history.

(56) References Cited

U.S. PATENT DOCUMENTS

| 4,617,638 | A | * | 10/1986 | Krause ................. C10B 45/00 201/1 |
| 5,180,226 | A | * | 1/1993 | Moslehi ............... G01J 5/0003 250/339.04 |
| 5,305,417 | A | * | 4/1994 | Najm .................. B24B 37/013 118/724 |
| 2003/0236642 | A1 | | 12/2003 | Timans |
| 2009/0091817 | A1 | | 4/2009 | Jennings et al. |

FOREIGN PATENT DOCUMENTS

| JP | 6323916 A | 11/1994 |
| JP | 11329993 A | 11/1999 |

(Continued)

OTHER PUBLICATIONS

International Search Report and Written Opinion of PCT/KR2013/004427 mailed on Sep. 4, 2013.

*Primary Examiner* — Mark Paschall (57) ABSTRACT

The present invention relates to a substrate treatment apparatus and method which perform heat treatment on a substrate, and can accurately measure the temperature of the substrate even at a low temperature. An embodiment of the present invention includes a process chamber that has a substrate treatment space, a heating housing that contains a plurality of heating lamps for generating radiant energy, a window that is placed between the heating housing and the process chamber to maintain the air-tightness of the process chamber and transmit the radiant energy to be transferred to a substrate, a first pyrometer that measures a wavelength generated at the substrate in the process chamber, and converts the wavelength into substrate measurement energy, a second pyrometer that measures a wavelength generated at the window, and converts the wavelength into window measurement energy; and a heating controller that compensates for the window measurement energy in the substrate measurement energy, thereby calculating the temperature of the substrate itself, and uses the calculated temperature of the substrate itself to control the heating lamps.

13 Claims, 5 Drawing Sheets

(56) References Cited

FOREIGN PATENT DOCUMENTS

| | | |
|---|---|---|
| JP | 2000173946 A | 6/2000 |
| JP | 2003234304 A | 8/2003 |
| JP | 2009231694 A | 10/2009 |
| KR | 20050014877 A | 2/2005 |
| KR | 20090130662 A | 12/2009 |
| KR | 201000064486 A | 6/2010 |

* cited by examiner

APPARATUS FOR SUBSTRATE TREATMENT AND METHOD FOR OPERATING THE SAME

TECHNICAL FIELD

The present invention relates to a substrate treatment apparatus and method which are for performing a heat treatment on a substrate, and can accurately measure the temperature of a substrate even at a low temperature.

BACKGROUND ART

Semiconductor devices are generally made by repeating unit processes, such as an ion implantation process, a thin film deposition process, and a heat treatment process, several times. The heat treatment process of the unit processes is applied to a process of thermally oxidizing a substrate, a process of thermally diffusing implanted ions, and various annealing processes. Specifically, as examples of the heat treatment process, there are annealing for restoring crystallinity after implanting impurity ions, annealing for improving the characteristics of the interface between a silicon (Si) film and a silicon oxide ($SiO_2$) film, sintering for forming silicide, etc.

As heat treatment apparatuses for performing those heat treatment processes, there are furnaces, rapid thermal process (RTP) apparatuses, and so on. Particularly, the RTP apparatuses have advantages of obtaining desired effects using high temperatures, and performing a heat treatment process in a short time (in generally, several tens seconds to about several minutes) to minimize a side effect of impurity generation, and thus are being widely used for heat treatment processes.

The heat treatment apparatuses use heating lamps such as tungsten halogen lamps (0.8 µm to 4 µm) to apply heat to silicon substrates, and measure the temperatures (energy states) of the substrates with pyrometers. In the apparatuses, heat controllers receive the measured values as feedback, and control the heating lamps.

Figure 1:
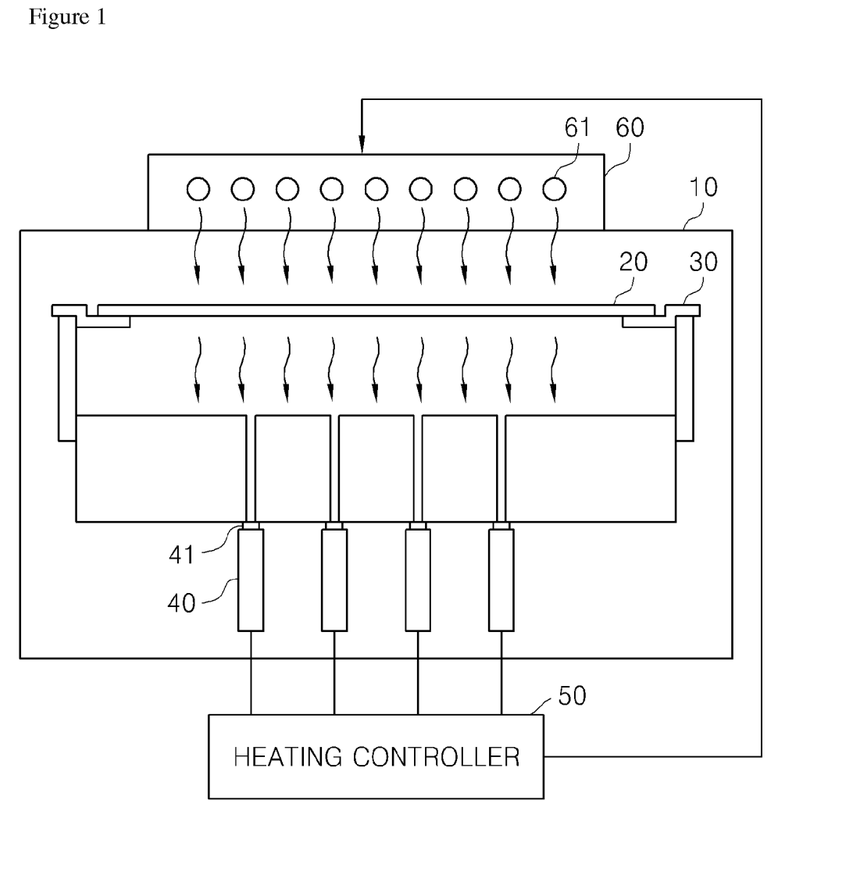
FIG. 1 is a schematic diagram for explaining a heat treatment apparatus.

FIG. 1 is a schematic diagram for explaining a low-temperature heat treatment apparatus. As shown in FIG. 1, in a state where a substrate 20 has been safely placed on a substrate supporting portion such as an edge ring 30 in a process chamber 10, heat treatment is performed with a plurality of heating lamps 61, and the temperature of the substrate 20 is measured in a non-contact manner with pyrometers 40 for measuring a long-wavelength range. Hereinafter, a pyrometer means a pyrometer for measuring radiant energy of a long-wavelength range of 5 µm to 15 µm and converting the radiant energy into a temperature.

Therefore, the pyrometers 40 can collect the radiant energy, emitted from the substrate 20 and having a long wavelength of 5 µm to 15 µm and low temperatures of 500° C. or less, through lenses 41, and calculate the temperature of the substrate in a non-contact manner on the basis of the relation between black body radiation and temperature. The temperatures calculated in the pyrometers 40 are fed back to a heating unit 60 through a heating controller 50, such that temperature control is performed on the plurality of heating lamps 61.

Meanwhile, a pyrometer 40 of a RTP apparatus uses a wavelength range of 0.9 µm to 1.1 µm to measure temperature, and the measurement span of the pyrometer is about 450° C. to 1250° C. Meanwhile, the transmittance of the substrate which is measured by a pyrometer using the wavelength range of 0.9 µm to 1.1 µm depends on the temperature of the substrate. For example, at 25° C. (room temperature), the transmittance of the substrate is about 0.6, and at 500° C. or greater, the substrate has the transmittance of 0 (opacity).

In other words, the material of a silicon substrate transmits light at a temperature less than 500° C. or less. Therefore, in a case where the temperature of the substrate is less than 500° C., a part of light of the heating lamps passes through the substrate. Therefore, in the case where the temperature of the substrate is less than 500° C., a part of light of the heating lamps passes through the substrate, and thus the pyrometers cannot measure the accurate temperature of the substrate, resulting in an temperature measurement error. In other words, in the case where the temperature of the substrate is less than 500° C., the wavelength generated at the substrate itself and the wavelength of the light having passed through the substrate are added and measured in the pyrometers. For this reason, the present heat treatment apparatus cannot measure the accurate temperature of the substrate at a temperature less than 500° C., and thus cannot perform a rapid heat process at a low temperature.

RELATED PRIOR LITERATURE

Korea Patent Publication NO. 10-2010-0064486

DISCLOSURE

Technical Problem

An object of the present invention is to accurately measure the temperature of a substrate in a substrate treatment apparatus and particularly prevent an error in measuring the temperature of a low-temperature substrate. Another object of the present invention is to feed a measured temperature back to control the amount of radiant energy of heating lamps in real time.

Technical Solution

An embodiment of the present invention includes a process chamber that has a substrate treatment space, a heating housing that contains a plurality of heating lamps for generating radiant energy, a window that is placed between the heating housing and the process chamber to maintain the air-tightness of the process chamber and transmit the radiant energy to be transferred to a substrate, a first pyrometer that measures a wavelength generated at the substrate in the process chamber, and converts the wavelength into substrate measurement energy, a second pyrometer that measures a wavelength generated at the window, and converts the wavelength into window measurement energy; and a heating controller that compensates for the window measurement energy in the substrate measurement energy, thereby calculating the temperature of the substrate itself, and uses the calculated temperature of the substrate itself to control the heating lamps.

Also, the process chamber includes an edge ring for safely placing the substrate at a position in the substrate treatment space facing the heating housing, and a substrate supporting portion that supports the edge ring inside the substrate treatment space of the process chamber, and rotates the edge ring.

Further, the first pyrometer and the second pyrometer are pyrometers for detecting a wavelength greater than 4 µm, and are arranged as a pair at positions facing each other. Furthermore, the heating controller subtracts the window measurement energy from the substrate measurement energy, thereby calculating the energy of the substrate itself, and calculates the temperature of the substrate itself on the basis of the energy of the substrate itself.

Another embodiment of the present invention includes a process of detecting a wavelength generated at a substrate subjected to heat treatment by heating lamps, and converting the wavelength into substrate measurement energy, a process of detecting a wavelength generated at a partial surface of a window transmitting the energy of the heating lamps, and converting the wavelength into window measurement energy, a process of subtracting the window measurement energy from the substrate measurement energy, thereby calculating the temperature of the substrate itself, and a process of using the calculated temperature of the substrate itself to control the heating lamps.

Also, conversion of each wavelength into energy is performed by $E=(hc)/\lambda$, where E, $\lambda$, h, and c denote the energy, the wavelength, a Planck constant, and a light speed, respectively.

Further, in the process of calculating the temperature of the substrate itself, the window measurement energy is subtracted from the substrate measurement energy, whereby the energy of the substrate itself is calculated, and then on the basis of the energy of the substrate itself, the temperature of the substrate itself is calculated.

Furthermore, when the substrate measurement energy, the window measurement energy, the energy of the substrate itself, the transmittance of the window, and the emissivity of the substrate are denoted by $E_{TOT}$, $E_{WD}$, $E_W$, $\tau_{WD}$, and $\epsilon_W$, respectively, the energy $E_W$ of the substrate itself is calculated as follows:

$$E_W=(E_{TOT}-\tau_{WD}\times E_{WD})/\epsilon_W$$

Advantageous Effects

According to the embodiments, the first pyrometer for measuring the temperature of the substrate and the second pyrometer for measuring the temperature of the window are provided to compensate a measured value. Therefore, it is possible to accurately measure the temperature of the substrate. Particularly, in a case of a low-temperature substrate, even if the radiant energy of the heating lamps passes through the substrate, it is possible to measure the temperature of the substrate without any errors. Also, according to the embodiments of the present invention, it becomes possible to accurately measure the temperature of a substrate at a low temperature state, and thus it is possible to thermally treat a substrate at a low temperature. Therefore, the present invention can be applied to various substrate treatment processes, regardless of temperature, and thus competitiveness in device manufacturing costs can be enhanced.

BEST MODE

Hereinafter, embodiments of the present invention will be described in more detail with reference to the accompanying drawings. However, the present invention is not limited to the embodiments to be disclosed below, but can be implemented in various different forms. The embodiments are provided merely for perfecting disclosure of the present invention and making those skilled in the art completely know the scope of the invention. On the drawings, the same reference symbol denotes identical elements.

Hereinafter, a substrate can correspond to every object having a material through which a part or all of light passes. For example, various materials, such as a wafer of a silicon material, and plastic of a polymer material, which transmit a part or all of light can be used as the substrate.

Figure 2:
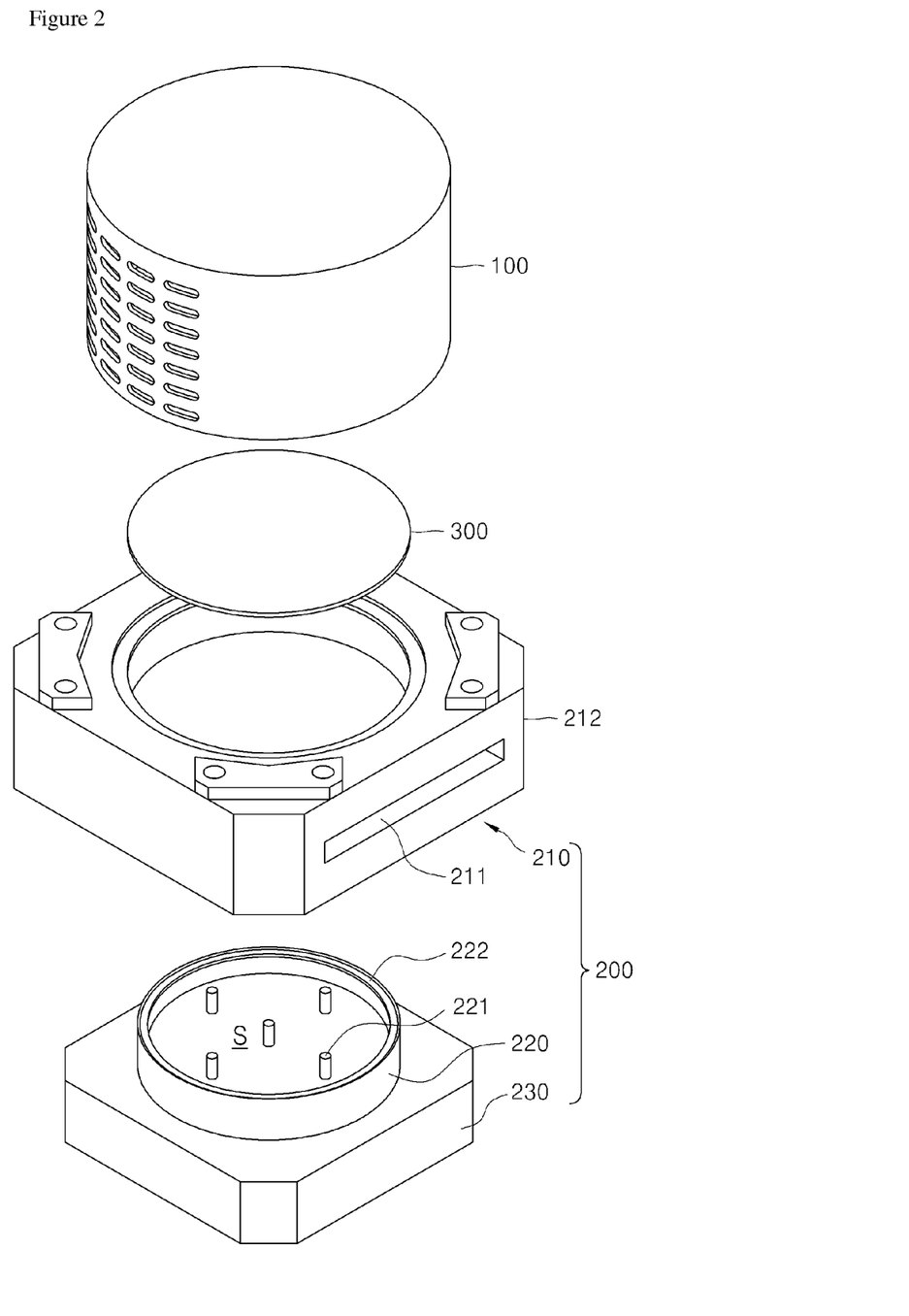
FIG. 2 is an exploded perspective view of a substrate treatment apparatus which has a heating housing and a process chamber and perform heat treatment according to an embodiment of the present invention.
Figure 3:
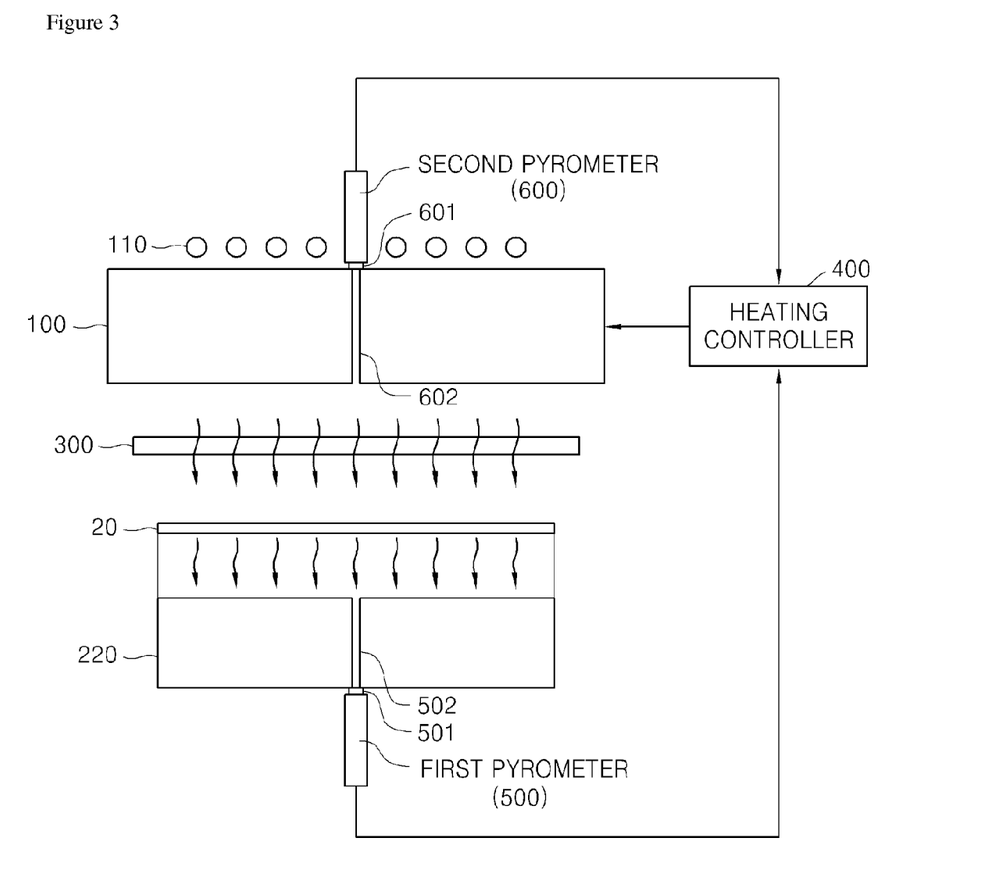
FIG. 3 is a functional block diagram for explaining temperature measurement and heat treatment in the heat treatment apparatus having the heating housing and the process chamber according to the embodiment of the present invention.

FIG. 2 is an exploded perspective view of a substrate treatment apparatus which has a heating housing and a process chamber and perform heat treatment according to an embodiment of the present invention, and FIG. 3 is a functional block diagram for explaining temperature measurement and heat treatment in the heat treatment apparatus including the heating housing and the process chamber according to the embodiment of the present invention.

The heat treatment apparatus can directly heat a substrate with energy emitted from heating lamps or the like, thereby rapidly increasing the temperature of the substrate.

The heat treatment apparatus is configured to include a process chamber 200 that has a substrate treatment space, a heating housing 100 that includes a plurality of heating lamps for generating radiant energy, a window 300 that is provided between the heating housing and the process chamber to maintain the air-tightness of the process chamber and transmit the radiant energy to be transferred to a substrate, a first pyrometer 500 that measures a wavelength generated at the substrate in the process chamber and converts the wavelength into substrate measurement energy, a second pyrometer 600 that measures a wavelength generated at the window and converts the wavelength into window measurement energy, and a heating controller 400 that compensates for the window measurement energy in the substrate measurement energy, thereby calculating the temperature of the substrate itself, and uses the calculated temperature of the substrate itself to perform feed-back control on the heating lamps. Further, although not shown, the heat treatment apparatus may further include a pressure adjusting unit that adjusts the internal pressure of the process chamber 200 and is usable for bringing the process chamber 200 into high vacuum.

The heating housing 100 contains a plurality of heating lamps 110 for generating radiant energy. The radiant energy appears in the form of light generated by the heating lamps 110, and the substrate is heated by the radiant energy of radiant heat generated by the heating lamps 110. The heating housing 100 has a light path (hereinafter, referred to as a "second light path") 602 formed through the heating housing and transferring the wavelength of light to a condensing lens (hereinafter, referred to as a "second condensing lens") 601 of the second pyrometer 600. Accordingly, at an end of the second light path 602 of the heating housing 100, the second condensing lens 601 of the second pyrometer 600 is positioned to be able to measure the wavelength of light radiated through the heating housing 100.

The heating lamps 110 are a bulb type or a linear type and are arranged in a plurality of zones in a radial direction. The heating lamps 110 are implemented as tungsten halogen lamps or arc lamps, and radiate energy in a near-infrared form. The heating lamps 110 are made in a hollow pipe shape, and in a case where the heating lamps are implemented as halogen tungsten lamps, inside the heating lamps, filaments for generating radiant energy are provided. It is preferable to make the bodies of the lamps of glass or quartz, thereby making it possible for the radiant energy of radiant heat to pass through the bodies without any losses. Further, it is effective to fill the insides of the heating lamps with inert gases (for example, argon).

The process chamber 200 has an internal space (substrate treatment space) which is a space for heat treatment on the substrate, and the substrate is safely placed inside the substrate treatment space. The process chamber is formed in a hollow and cylindrical or rectangular pipe shape, but is not limited thereto. The process chamber can be made in various pipe shapes. In other words, a cylindrical shape or polygonal pipe shape is possible. Further, at one side and another side of the process chamber 200, a substrate entrance/exit gate 211 for entrance and exit of a substrate are provided, respectively, and any one substrate entrance/exit gate 211 is connected to a transfer module (not shown).

The process chamber 200 includes a substrate supporting portion 220 for supporting a substrate such as an edge ring 222 for supporting a substrate, a base portion 230 for supporting the substrate supporting portion 220, and a process kit 210 for covering the substrate supporting portion.

Inside the substrate supporting portion 220, a plurality of lift pins 221 that moves vertically, and the edge ring 222 on which a substrate are safely placed may be provided. The edge ring 222 is a safely placing means capable of safely placing a substrate at a position in the substrate treatment space facing the heating housing 100. In order to thermally and uniformly treat a substrate, it is made possible to support the substrate by the substrate supporting portion 220 and rotate the substrate by a drive motor. On the circumference of the substrate supporting portion 220, the process kit 210 is provided. Therefore, when a heat treatment process is performed, the substrate supporting portion is placed inside the process kit 210, and a substrate safely placed on the edge ring 222 is rotated at a constant speed by rotation of the substrate supporting portion 220. Besides, the substrate supporting portion may be supported by supports such as pins or a holder, not by the edge ring, and may have various support forms. Also, the substrate supporting portion may have the form of a structure that fixes a substrate without rotating the substrate.

The substrate supporting portion 220 has a light path (hereinafter, referred to as a "first light path") 502 formed through the substrate supporting portion as a path for transferring the wavelength of light to a condensing lens (hereinafter, referred to as a "first condensing lens") 501 of the first pyrometer 500. Accordingly, at an end of the first light path 502 of the substrate supporting portion 220, the first condensing lens 501 of the first pyrometer 500 is placed to be able to measure the wavelength of light radiated through the substrate supporting portion 220.

The base portion 230 is a housing for supporting the substrate supporting portion 220. A shaft (not shown) for supporting the substrate supporting portion penetrates the base portion 230, and is rotated by driving of an external motor (not shown), whereby the substrate supporting portion 220 rotates.

The process kit 210 includes a quartz cylinder 212 that covers the circumference of the substrate supporting portion 220, and a substrate entrance/exit gate 211 for entrance and exit of the substrate formed at least one of one side and another side of the process kit, and any one substrate entrance/exit gate 211 is connected to a substrate transfer module (not shown). A substrate W is inserted through a substrate entrance/exit gate 211 of the process kit 210, and is placed on the edge ring 222 of the substrate supporting portion 220. For reference, in a case where a substrate is inserted into the process kit, in a state where the lift pins 221 has raised, the substrate is inserted and is placed on the lift pins 221, and the lift pins 221 are lowered to place the substrate on the edge ring 222. In contrast, in a case where the substrate is taken out, the lift pins 221 is raised to raise the substrate from the edge ring 222, and then the substrate can be take out through a substrate entrance/exit gate 211.

Between the heating housing 100 and the process kit 210, the window 300 is provided to transmit heat energy radiated from the heating lamps, thereby transferring the heat energy to the substrate. The window 300 maintains air-tightness between the heating housing 100 and the process kit 210 to block the heating housing 100 and the process kit 210 from each other and protect the process chamber from the external environment (gases and contaminants). Also, the window 300 protects the heating lamps 110, and prevents by-products generated due to heat generated by the heating lamps from dropping to the substrate placed in the substrate treatment space of the inside of the process chamber. It is effective to use transmissive quartz for the window 300. However, it is apparent that various translucent materials other than the quartz window can be used.

The heating controller 400 uses temperatures calculated in the first pyrometer 500 and the second pyrometer 600 to perform feed-back control on the heating lamps 110.

Figure 4:
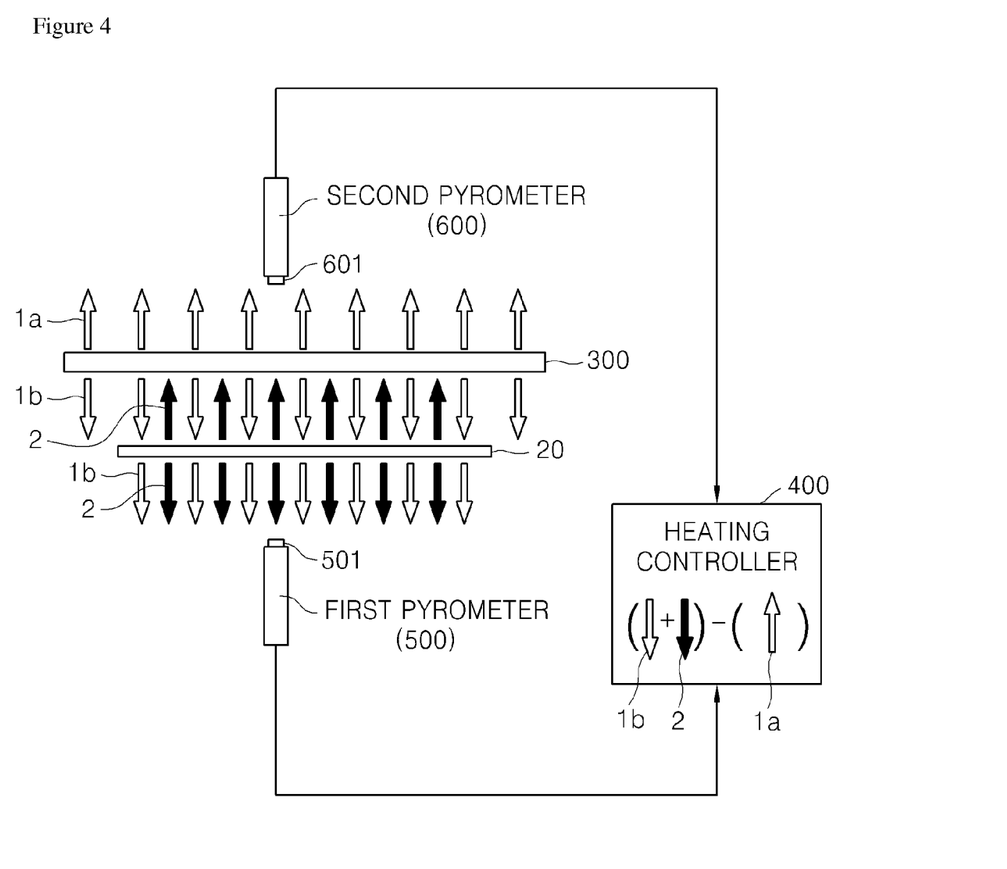
FIG. 4 is a conceptual view illustrating the wavelength of energy generated at a window itself, and the wavelength of energy generated at a substrate itself.

Meanwhile, while the window transmits the radiant energy of a wavelength range from 0.2 μm to 4 μm of the heating lamps to radiate the radiant energy downward to the substrate, the window absorbs wavelength ranges less than 0.2 μm or greater than 4 μm such that the window is heated and radiates the energy of the heated widow itself upward and downward to the substrate. FIG. 4 is a conceptual view illustrating the wavelength of energy which is generated at the window itself, and the wavelength of energy which is generated at the substrate itself, and will be described with FIG. 5 in detail.

Figure 5:
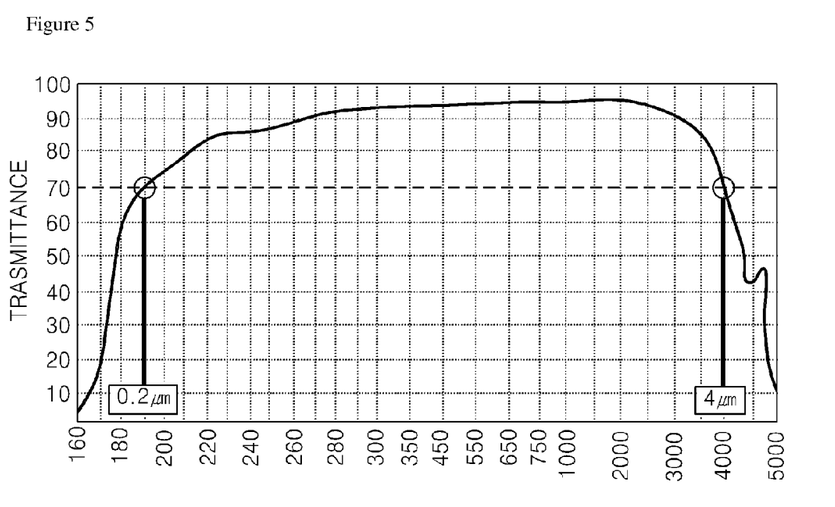
FIG. 5 is a graph illustrating transmittance in each wavelength range.

Due to the characteristics of the material of the window, the window has energy transmittance of 70% or greater in the wavelength range from 0.2 μm to 4 μm, as shown in FIG. 5. Therefore, most of the wavelength range from 0.2 μm to 4 μm passes through the window, and thus acts as a heat source for the substrate. However, the wavelength ranges less than 0.2 μm or greater than 4 μm are blocked and absorbed by the window 300. Therefore, as shown in FIG. 4, the window 300 absorbing wavelengths less than 0.2 μm or greater than 4 μm obtains energy, and due to this absorbed energy, wavelengths 1a and 1b of the form of far-infrared are generated at the top and bottom surfaces of the window.

Therefore, from the bottom surface of the window 300, wave-like radiant energy (not shown) (hereinafter, referred to window bottom surface penetration energy) of 0.2 μm to 4 μm having been generated by the heating lamps and passing through the window, and wave-like energy (hereinafter, referred to window bottom surface self-energy) 1b generated at the window itself heated by the wavelengths less than 0.2 μm or greater than 4 μm generated by the heating lamps are radiated together. Also, from the top surface of the window 300, wave-like energy (hereinafter, referred to as window top surface self-energy) 1a generated at the window itself heated by the wavelengths less than 0.2 μm or greater than 4 μm generated by the heating lamps is radiated. The window bottom surface self-energy $1b$ and the window top surface self-energy $1a$ are energies radiated upward and downward from the window, and thus have the same intensity.

Also, the substrate is heated by the wave-like radiant energy (window bottom surface penetration energy) of 0.2 μm to 4 μm passing through the window, and this heating makes the window radiate an energy wave 2 by itself.

Meanwhile, in a case where the substrate has a characteristic of transmitting a part of light at a temperature less than 500° C., and thus the temperature of the substrate is less than 500° C., a part of the radiant energy of the heating lamps passes through the substrate. Therefore, in the case where the temperature of the substrate is less than 500° C., the radiant energy of the heating lamps passes through the substrate, and thus the first pyrometer for measuring the temperature of the substrate cannot measure the accurate temperature of the substrate, resulting in a temperature measurement error. In other words, in the case where the temperature of the substrate is less than 500° C., the wavelength generated at the substrate and the wavelength of the light of the heating lamps passing through the substrate are added and measured in the pyrometer. For this reason, in the related art, at a temperature less than 500° C., it is impossible to measure the accurate temperature of the substrate and thus it is impossible to perform a low-temperature heat treatment process.

In order to solve this problem, the embodiment of the present invention has a plurality of first pyrometers 500 passing through the inside of the substrate supporting portion 220 and supporting the edge ring on which the substrate is safely placed. The first pyrometers 500 may be provided at an end of the first light path 502 of the substrate supporting portion 220 to be capable of wavelength measurement with respect to the bottom surface of the substrate.

The first pyrometers 500 measure wavelengths greater than 4 μm radiated from the substrate subjected to the heat treatment in the process chamber, and calculates the substrate measurement energy. For reference, each pyrometer is a device for measuring a wavelength, and includes a detector and a light source. The detector can receive radiant light emitted from the substrate, and reflected light of light, irradiated from the light source onto the substrate, from the substrate, and measure a waveform on the basis of the radiant intensity of the light, and emissivity. The wavelength measured in the pyrometer is converted into energy. When the energy, the wavelength, a Planck constant, and a light speed are denoted by E, λ, h, and c, respectively, as known, conversion of the wavelength into the energy can be performed by $E=(hc)/\lambda$. Therefore, it is possible to measure the wavelength generated at the substrate subjected to the heat treatment in the process chamber, and convert the wavelength into energy. From the above-mentioned equation, it can be seen that the energy and the wavelength are inversely proportional to each other. For reference, the value of the Planck constant h is $6.6626*10^{-34}$ [J/S], the light speed constant c has a value of $3*10^8$ [m/s]. Also, at an end of the first pyrometer 500, the first condensing lens 501 is provided to be able to condense light passing through the first light path 502 of the substrate supporting portion 220. Similarly to this, with respect to the second pyrometer 600 to be described below, the second condensing lens 601 is provided to be able to condense a wave to be transferred to the second pyrometer 600.

In the case where the substrate has a low temperature less than 500° C., a part of the wavelength of the radiant energy of the heating lamps is transferred to the first pyrometer 500 through the substrate. In order to prevent this radiant energy of the heating lamps from being detected, the first pyrometer 500 is implemented as a pyrometer for detecting wavelengths greater than 4 μm. As described above, due to the characteristics of quartz which is the material of the window, the window transmits 70% or greater of the wavelengths in the range from 0.2 μm to 4 μm while absorbing a part of the wavelengths of 0.2 μm to 4 μm, and absorbs most of the wavelengths less than 0.2 μm or greater than 4 μm while transmitting a part of the wavelengths less than 0.2 μm or greater than 4 μm. Therefore, most of the wavelengths less than 0.2 μm or greater than 4 μm of the radiant energy radiated from the heating lamps are absorbed by the window so as not to be transferred to the substrate.

Therefore, at the first pyrometer, the wavelengths greater than 4 μm provided from the heating lamps are not detected. Therefore, the first pyrometer is not influenced by the radiant energy of the heating lamps passing through the substrate, and thus can detect only the wavelengths greater than 4 μm generated at the substrate.

Meanwhile, the wavelength greater than 4 μm detected in the first pyrometer 500 placed below the substrate as shown in FIG. 4 is the sum of the wavelength 2 greater than 4 μm generated due to the temperature of the substrate itself, and the wavelength $1b$ of the window bottom surface self-energy generated at the window. The window absorbs the wavelengths less than 0.2 μm or greater than 4 μm of the radiant energy of the heating lamps so as to be heated up, and thus generates the wavelengths $1a$ and $1b$ of energy through the top surface and bottom surface of the window by itself. However, in the case where the substrate has a temperature less than 500° C., the wavelength $1b$ of the window bottom surface self-energy can be transferred to the first pyrometer through the substrate 20. Therefore, the wavelength greater than 4 μm measured by the first pyrometer 500 cannot be considered as the wavelength of energy generated at the substrate itself. In other words, since the first pyrometer for measuring the wavelength greater than 4 μm measures energy which is the sum of the wavelength 2 of the energy of the substrate itself and the window bottom surface self-energy $1b$ having passed through the substrate, as the substrate measurement energy, and calculates the temperature on the basis of the substrate measurement energy, the first pyrometer cannot calculate the temperature of the substrate itself.

In order to solve this problem, the embodiment of the present invention has the second pyrometer 600 for measuring the wavelength greater than 4 μm of energy generated by the window itself and converting the measured wavelength into the window measurement energy. Energy compensation using the second pyrometer makes it possible to measure the temperature of the substrate itself. The second pyrometer 600 detects the wavelength greater than 4 μm. The second pyrometer is placed on the window, measures energy of the wavelength $1a$ greater than 4 μm generated at the top surface of the window, and has a detector and a light source, similarly to the first pyrometer 500. Therefore, the detector can receive the radiant light radiated from the top surface of the substrate, and reflected light of light, irradiated from the light source onto the top surface of the window, from the top surface, and measure a waveform on the basis of the radiant intensity of the light, and emissivity.

The heating controller 400 compensates for the window measurement energy in the substrate measurement energies $1b$ and 2, thereby calculating the temperature of the substrate itself, and uses the calculated temperature of the substrate itself to perform feed-back control on the heating lamps. In other words, the heating controller subtracts the window top surface self-energy $1a$, which is the window measurement energy measured in the second pyrometer 600 placed on the window, from the substrate measurement energy (1b and 2) measured in the first pyrometer, thereby calculating the temperature of the substrate itself.

If the energy of the substrate itself is obtained by subtracting the window measurement energy from the measured energy, it is possible to use the energy of the substrate itself to calculate the temperature of the substrate itself. When the substrate measurement energy, the window measurement energy, the energy of the substrate itself, the transmittance of the window, and the emissivity of the substrate are denoted by $E_{TOT}$, $E_{WD}$, $E_W$, $\tau_{WD}$, and $\epsilon_W$, respectively, the energy $E_W$ of the substrate itself can be calculated as follows:

$$\text{by } E_W = (E_{TOT} - \tau_{WD} \times E_{WD})/\epsilon_W$$

If the energy of the substrate itself is calculated, it is possible to calculate the temperature of the substrate itself. When the energy of the substrate itself, the temperature of the substrate itself, the number of moles, and a gas constant are denoted by $E_W$, T, n, and R, respectively, the temperature T of the substrate itself can be calculated as follows:

$$T = (2 \times E_W) \div (3 \times n \times R)$$

The temperature of the substrate itself calculated as described above becomes a temperature based on the energy of the substrate itself excluding the energy transferred from the window and passing through the substrate. The heating controller 400 uses the calculated temperature of the substrate itself to perform feed-back control on the heating lamps, thereby capable of performing feed-back adjustment on the amount of luminescence energy of the heating lamps to maintain a desired substrate temperature.

Figure 6:
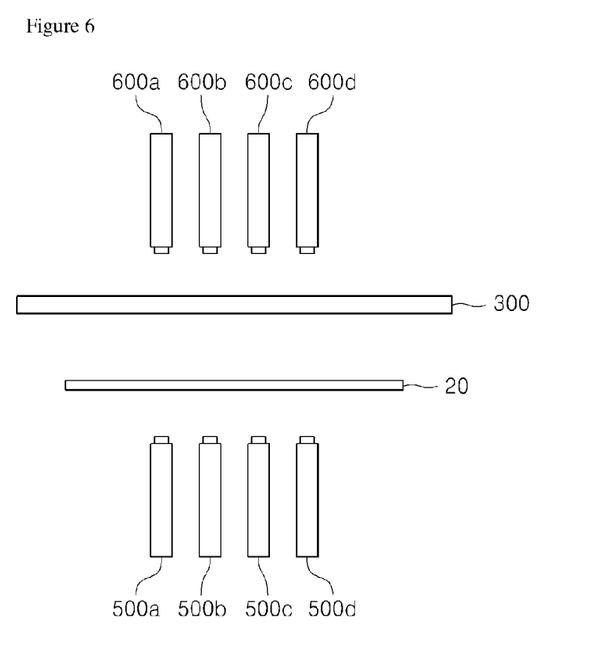
FIG. 6 is a view illustrating a plurality of pairs of pyrometers provided according to the embodiment of the present invention.

Meanwhile, a single first pyrometer and a single second pyrometer may be implemented to measure wavelengths; however, a plurality of pyrometers may be provided as shown in FIG. 6. A plurality of first pyrometers 500a, 500b, 500c, and 500d is provided to measure wavelengths generated at a plurality of points of the substrate, and similarly, a plurality of second pyrometers 600a, 600b, 600c, and 600d is provided to measure wavelengths generated at a plurality of points of the top surface of the window. The plurality of first pyrometers 500a, 500b, 500c, and 500d or the plurality of second pyrometers 600a, 600b, 600c, and 600d uses the average value of the measured wavelengths to measure the substrate measurement energy or the window measurement energy. Since not a local value but the average value is used, accurate measurement can be performed.

When the plurality of first pyrometers and the plurality of second pyrometers are used, the first pyrometers and the second pyrometers are provided in pairs (500a, 600a), (500b, 600b), (500c, 600c), and (500d, 600d), each of which is composed of a first pyrometer and a second pyrometer placed at positions facing each other. Since the first pyrometers and the second pyrometers are placed to face each other, it is possible to accurately measure the temperature of the substrate itself. The reason is that if the first pyrometers and the second pyrometers are placed not to face each other and measure wavelengths of different points, the correlation between substrate measurement energies or window measurement energies measured at the individual points becomes low.

Meanwhile, the foregoing description has been made on the example where the heating lamps are positioned at the upper portion of the process chamber and heats the substrate inside the process chamber, and the temperature of the substrate is measured. However, the present invention is not limited thereto, but various embodiments having a structure in which the heating lamps and the first pyrometer face each other. For example, the process chamber may be positioned on the heating lamps such that the heating lamps heat the substrate placed on the heating lamps. In this case, the first pyrometer for measuring the temperature of the substrate and the heating lamps may be implemented to face each other.

Although the present invention has been described with reference to the accompanying drawings and the above-mentioned preferable embodiments, the present invention is not limited thereto, but is limited by the following claims. Therefore, those skilled in the art can modify and change the present invention in various forms within the technical scope of the following claims.

The invention claimed is:

1. An apparatus for substrate treatment comprising:
   a process chamber that has a substrate treatment space;
   a heating housing that contains a plurality of heating lamps for generating radiant energy;
   a window that is placed between the heating housing and the process chamber to maintain the air-tightness of the process chamber and transmit the radiant energy to be transferred to a substrate;
   a first pyrometer that measures a wavelength generated at the substrate in the process chamber, and converts the wavelength into substrate measurement energy, wherein the first pyrometer is disposed under the substrate;
   a second pyrometer that measures a wavelength generated at the window, and converts the wavelength into window measurement energy, wherein the second pyrometer is disposed above the window; and
   a heating controller that compensates for the window measurement energy in the substrate measurement energy, thereby calculating the temperature of the substrate itself, and uses the calculated temperature of the substrate itself to control the heating lamps,
   wherein when the substrate is heat treated at a low temperature less than 500° C.,
   wherein the first pyrometer measures substrate measurement energy as radiant energy in a form of wavelengths greater than 4 μm radiated from the substrate subjected to the heat treatment at a temperature less than 500° C., and the second pyrometer measures window top surface self-energy as radiant energy in the form of wavelengths generated from a window top surface heated by wavelengths greater than 4 μm, and
   wherein the heating controller calculates a substrate self-temperature as a temperature of the substrate itself by subtracting the window top surface self-energy measured by the second pyrometer from the substrate measurement energy measured by the first pyrometer.

2. The apparatus for substrate treatment according to claim 1, wherein:
   the process chamber includes
   an edge ring for safely placing the substrate at a position in the substrate treatment space facing the heating housing, and
   a substrate supporting portion that supports the edge ring inside the substrate treatment space of the process chamber, and rotates the edge ring.

3. The apparatus for substrate treatment according to claim 1, further comprising:
   at least one first pyrometer that constitutes a plurality of first pyrometers, together with the first pyrometer, such that the plurality of first pyrometer measures wavelengths generated at a plurality of points of the substrate, respectively.

4. The apparatus for substrate treatment according to claim 3, further comprising:

at least one second pyrometer that constitutes a plurality of second pyrometers together with the second pyrometer, such that the plurality of second pyrometer measures wavelengths generated at the plurality of points of the substrate, respectively.

5. The apparatus for substrate treatment according to claim 4, further comprising:
the average value of the wavelengths measured in the plurality of first pyrometers or the average value of the wavelengths measured in the plurality of second pyrometers is used to measure the substrate measurement energy or the window measurement energy.

6. The apparatus for substrate treatment according to claim 1, wherein:
each first pyrometer and a corresponding second pyrometer are arranged as a pair at positions facing each other.

7. A substrate treatment method comprising:
a process of detecting a wavelength greater than 4 μm generated at a substrate subjected to heat treatment by heating lamps by a first pyrometer disposed under the substrate, and converting the wavelength into substrate measurement energy, wherein the substrate has a temperature less than 500° C.;
a process of detecting a wavelength generated at a partial surface of a window transmitting the energy of the heating lamps by a second pyrometer disposed above the window, and converting the wavelength into window measurement energy;
a process of subtracting the window measurement energy from the substrate measurement energy, thereby calculating the temperature of the substrate itself; and
a process of using the calculated temperature of the substrate itself to control the heating lamps.

8. The substrate treatment method according to claim 7, wherein:
a wavelength of 4 at each of the substrate and the top surface of the window, and is converted into energy.

9. The substrate treatment method according to claim 7, wherein:
conversion of each wavelength into energy is performed by $E=(hc)/\lambda$, where E, $\lambda$, h, and c denote the energy, the wavelength, a Planck constant, and a light speed, respectively.

10. The substrate treatment method according to claim 9, wherein:
in the process of calculating the temperature of the substrate itself, the window measurement energy is subtracted from the substrate measurement energy, whereby the energy of the substrate itself is calculated, and then on the basis of the energy of the substrate itself, the temperature of the substrate itself is calculated.

11. The substrate treatment method according to claim 9, wherein:
when the substrate measurement energy, the window measurement energy, the energy of the substrate itself, the transmittance of the window, and the emissivity of the substrate are denoted by $E_{TOT}$, $E_{WD}$, $E_W$, $\tau_{WD}$, and $C_W$, respectively, the energy $E_W$ of the substrate itself is calculated as follows:

$$E_W=(E_{TOT}-\tau_{WD}\times E_{WD})/\epsilon_W.$$

12. The substrate treatment method according to claim 11, wherein:
when the energy of the substrate itself, the temperature of the substrate itself, the number of moles, and a gas constant are denoted by $E_W$, T, n, and R, respectively, the temperature T of the substrate itself is calculated as follows:

$$T=(2\times E_W)\div(3\times n\times R).$$

13. An apparatus for substrate treatment comprising:
a process chamber that has a substrate treatment space;
a heating housing that contains a plurality of heating lamps for generating radiant energy;
a window that is placed between the heating housing and the process chamber to maintain the air-tightness of the process chamber and transmit the radiant energy to be transferred to a substrate;
a first pyrometer that measures a wavelength generated at the substrate in the process chamber, and converts the wavelength into substrate measurement energy, wherein the first pyrometer is disposed under the substrate;
a second pyrometer that measures a wavelength generated at the window, and converts the wavelength into window measurement energy, wherein the second pyrometer is disposed above the window; and
a heating controller that compensates for the window measurement energy in the substrate measurement energy, thereby calculating the temperature of the substrate itself, and uses the calculated temperature of the substrate itself to control the heating lamps, wherein, when the substrate is heat treated at a low temperature less than 500 degrees C., the first pyrometer measures substrate measurement energy as radiant energy in a form of wavelengths greater than 4 micro-meters radiated from the substrate subjected to the heat treatment at a temperature less than 500 degrees C., and the second pyrometer measures window top surface self-energy as radiant energy in the form of wavelengths generated from a window top surface heated by wavelengths greater than 4 micro-meters.

* * * * *